United States Patent
Anderson et al.

[15] 3,659,100
[45] Apr. 25, 1972

[54] SYSTEM AND METHOD OF AIR POLLUTION MONITORING UTILIZING CHEMILUMINESCENCE REACTIONS

[72] Inventors: Howard H. Anderson, Covina; Rudolph H. Moyer, West Covina; Donald J. Sibbett, Cucamonga; David C. Sutherland, El Monte, all of Calif.

[73] Assignee: Geomet, Incorporated, Rockville, Md.

[22] Filed: Aug. 14, 1970

[21] Appl. No.: 63,844

[52] U.S. Cl. .................... 250/71 R, 23/230 R, 23/252 R, 250/435 R, 250/218
[51] Int. Cl. ............................................. G01j 1/42
[58] Field of Search ............ 250/71 R, 71.5 R, 83.3 UV, 250/43.5 R, 218; 128/1; 356/96, 51, 97; 23/230, 252; 350/3

[56] References Cited

UNITED STATES PATENTS 3,359,973  12/1967  Hoffman .................... 250/71 R X
3,457,407  7/1969   Goldberg .................... 250/71 R Primary Examiner—Morton J. Frome
Attorney—David H. Semmes

[57] ABSTRACT

An instrumental system and method for detecting and analyzing pollutant gases in the atmosphere, particularly sulfur dioxide, ozone, nitrogen dioxide, and nitric oxide utilizing the catalyzed chemiluminescence reaction of luminol (5-amino-2, 3-dihydro-1-4-phthalazinedione) with hydrogen peroxide. Sampled air streams, after appropriate treatment by adsorption column, are reacted with surface films of luminol-hydrogen peroxide solutions to give continuous, real time analysis of pollutant gases.

The chemiluminescence method of monitoring air pollutants utilizes five or six microreactors (channels) simultaneously which are monitored sequentially by a single photomultiplier. Channel monitoring is controlled by a rotary shutter which moves discretely from channel (microreactor) to channel. Quantitative analysis of the gaseous components of the atmosphere is obtained by comparison of the signals obtained from the separate channels with calibrated standards for each channel. Signal processing may utilize simple computer circuitry.

23 Claims, 8 Drawing Figures

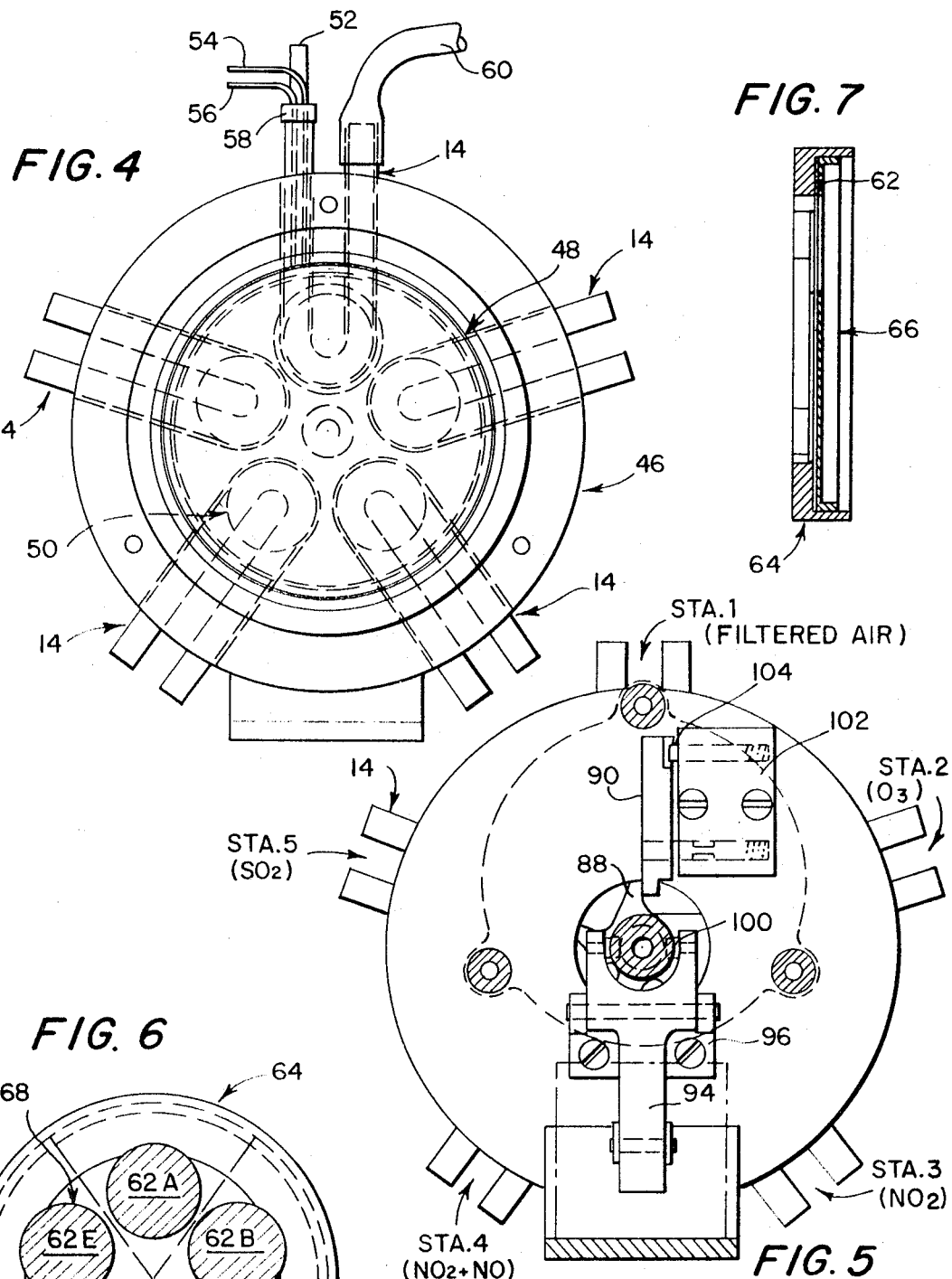

SYSTEM AND METHOD OF AIR POLLUTION MONITORING UTILIZING CHEMILUMINESCENCE REACTIONS

BACKGROUND OF THE INVENTION

Chemiluminescence emitted during oxidation of luminol is initiated by a number of chemical compounds. Hematin and porphyrins are known to catalyze the hydrogen peroxide-luminol reaction. Microorganisms, tissue cells, and materials containing such iron-porphyrins as catalase may be detected and analyzed by utilization of the reaction. Nerve gases, cyanide ion, sodium hypochlorite, potassium ferricyanide, and transition metal ions also initiate the reaction under appropriate conditions. In principal, initiation of any of three classes of reaction mechanism may be operative: (a) peroxide decomposition, (b) electron transfer reactions, and (c) formation of excited oxygen. Each of these initiating steps is followed by oxidation of luminol to aminophthallic acid, during which photon emission occurs with a spectral maximum in the range of 430 m$\mu$. This emission of light may be utilized to follow or analyze the specified reactions.

This invention relates to the detection and quantitation of pollutant gases in the air: sulfur dioxide, ozone, nitrogen dioxide, and nitric oxide, as well as chlorine and other as yet unrecognized gaseous components, which are capable of initiating the reaction between luminol and hydrogen peroxide. The object of this invention is to provide a simple form of instrumentation for applying the well-established luminol-chemiluminescence technology to solving the problems associated with obtaining a nearly real-time analysis of pollutant gases. A related object is to provide a sufficiently high degree of sensitivity in the instrumentation to measure all normal ambient levels of the pollutant gases. These concentrations are normally below 1 part-per-million by volume and may routinely be as low as a few parts per billion in relatively clean air. Since the luminol oxidation is uniquely sensitive to very low pollutant levels appropriate utilization of this reaction, as defined herein, yields a novel, rapid, reliable, and extremely sensitive multiple-gas air monitoring system and method.

SUMMARY OF THE INVENTION

The present invention, while broadly pertaining to detection and analyses of pollutant gases in the air which may be monitored separately by other methods, is particularly valuable because of the simplicity and sensitivity of the method involved. Another major advantage of this approach accrues from utilization of a single technique for determination of the four major gaseous pollutants. This establishes a cross-checking or internal consistence capability which is not attainable when differing techniques are employed for each of the pollutants. As a result, a much more compact monitoring system is possible with attendant improvements in engineering design requirements.

An automatic Chemiluminescence Air Monitor in accordance with the invention utilizes a single photomultiplier as a sensor for five or six reactor cells or channels.

The instrumentation basically consists of an air supply fed via a manifold through limiting orifices into five or six ¼ in. diameter (I.D.), or smaller, U-tube cells. At the entry to each cell, a small quantity ( ~ 0.1 ml./min.) of luminol-hydrogen peroxide solutions are added to the air stream. The heterogeneous system (air-liquid) flows through the cells to a liquid gas separator (drop-out pot) and thence to waste. The sensor signal, in terms of light output, occurs at the surface of the gas-liquid interface in these cells. The sampled air passes through the vacuum pump while the liquid may be bled off from the separator or continuously removed. No pumps are required, the liquid and air are transported by the single vacuum pump acting through the cells and liquid-air separator lines. The ambient air streams passing to the cells are processed in absorption columns in order to separate the gaseous components which are measured.

Additional features, advantages and objects of the invention will be more readily apparent from the following detailed description of an embodiment thereof when taken together with the accompanying drawings in which:

FIG. 4 is a sectional view taken on line 4—4 of FIG. 3;

FIG. 5 is a sectional view taken on line 5—5 of FIG. 3;

FIG. 6 is a schematic view of a filter holder and retainer for in-line use;

FIG. 7 is a sectional view of a filter retainer corresponding with FIG. 6; and

Figure 1:
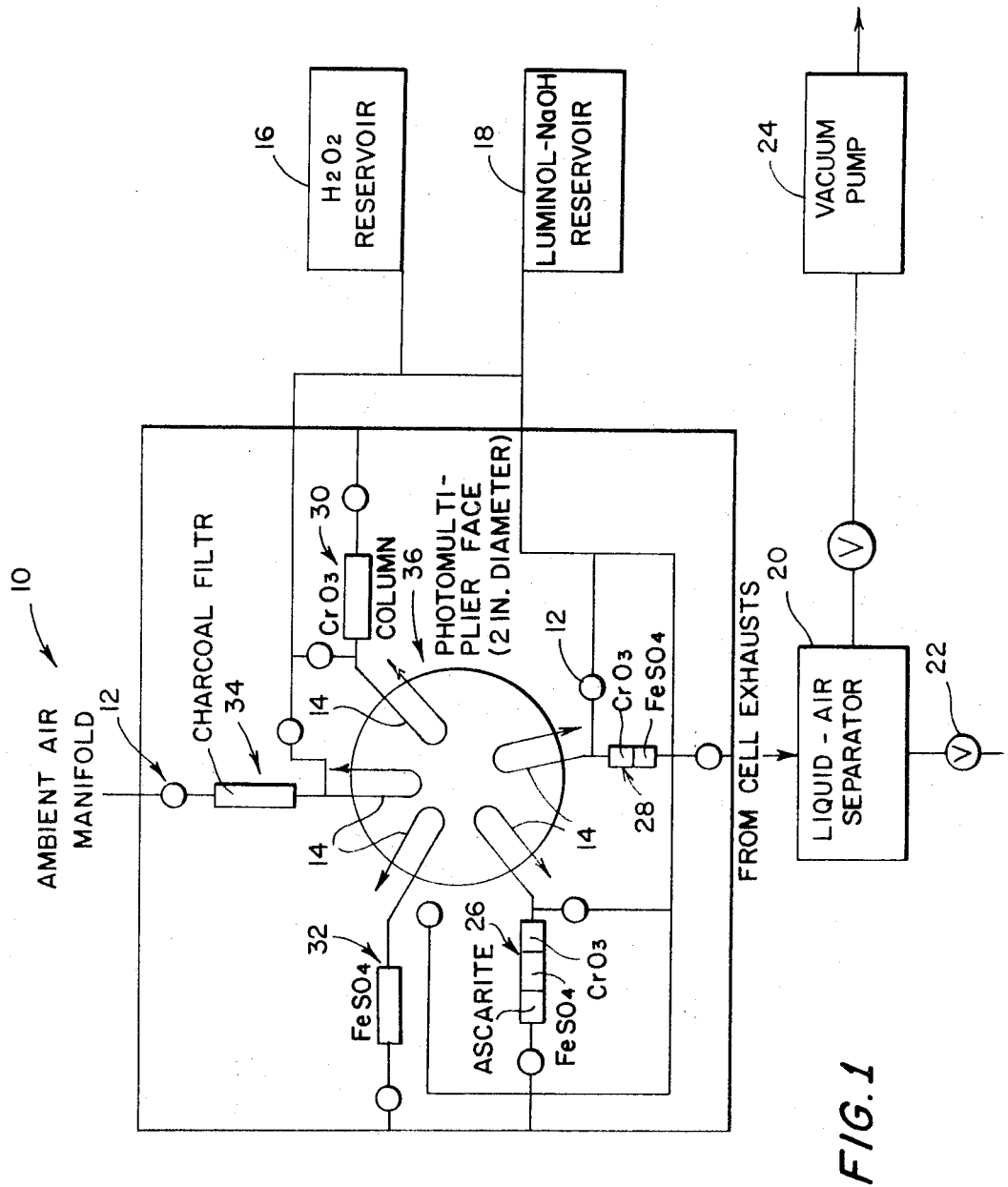
FIG. 1 is a schematic diagram of an automatic chemiluminescence air monitor in accordance with the invention indicating air and liquid flow paths.

Referring now more specifically to the drawings a concept of the broad principles of the invention is apparent from the schematic diagram of the monitor in FIG. 1 showing the various air and liquid flow paths. The air supply is fed via an ambient air manifold generally indicated at 10 through limiting orifices generally designated 12 into a plurality of, in the present instance five, preferably ¼ in. diameter (I.D.) or smaller, U-tube cells indicated at 14. At the entry to each cell, a small quantity (0.1 ml./min.) of luminol-hydrogen peroxide solutions from reservoirs 16 and 18 thereof respectively are added to the air stream. The heterogeneous system (air-liquid) flows through the cells to a liquid gas separator 20 in the nature of a drop-out pot and thence to waste as indicated at 22. A desired sensor signal, in terms of light output, occurs at the surface of the gas-liquid interface in these cells. The sampled air passes through vacuum pump 24 while the liquid can be bled off from the separator or continuously removed. No pumps are required, the liquid and air being transported by the single vacuum pump 24 acting through the cells 14 and liquid-air separator (20) lines.

The ambient air streams passing to the cells are processed in adsorption columns in order to separate the gaseous components which are measured. Five adsorbent columns 26, 28, 30, 32 and 34 are used. The nature and functions of these columns are indicated as follows:

| Column | Gaseous Outputs |
| --- | --- |
| 26. Ascarite-Ferrous Sulfate Chromic Oxide | Nitric Oxide as Nitrogen Dioxide |
| 28. Ferrous Sulfate Chromic Oxide | Nitric Oxide and Nitrogen Dioxide |
| 30. Chromic Oxide | Ozone, Nitrogen Dioxide, and Nitric Oxide |
| 32. Ferrous Sulfate | Sulfur Dioxide |
| 34. Charcoal | Filtered air for background sample |

The cells 14 are arranged in conjunction with a cell assembly photo-multiplier as indicated at 36 and in the shown and described embodiment set up for five channels. This cell assembly is shown in greater detail in FIGS. 3–7 inclusive. The structure includes a photo-multiplier tube housing assembly 38 having a photo-multiplier tube 40 mounted and contained therein with appropriate connections including a high voltage connector 42 and a signal out connector 44. Connected to housing 38 is a reaction cell housing generally designated 46 by appropriate means which mounts the various U-shaped testing cells 14 having a configuration as shown in FIG. 4. The reaction cell configurations are all similar in the apparatus. The cells are mounted through radial slots 48 leading to apertures 50 in the reaction cell housing. Interconnected into a leg of each test cell is an air tube 52 for introduction of ambient air for testing and a luminol in tube 54 and hydrogen peroxide ($H_2O_2$) in tube 56 all of which enter through a teflon plug 58 sealing the end of the tube. The opposite end of the test cell is connected by tube 60 for exhaust. The foregoing details are apparent from FIG. 4 of the drawings. Interposed between the test cells and photo-multiplier tube assembly is a neutral density filter generally 62 consisting of five filter segments 62A, 62B, 62C, 62D and 62E supported in a filter holder 64 in conjunction with a filter retainer 66. Apertures 68 are provided in line in the filter holder and retainer to permit filter operation. Filter details are shown in FIGS. 6 and 7. A rotary shutter 70 is rotatably mounted on a shaft in bearing 72 and is provided with a shutter aperture 74 having a light sealing O-ring 76 around the shutter aperture.

A drive motor 78 is provided for the rotary shutter and which preferably can consist of a 10 r.p.m. synchronous, 110 v. AC, 60 Hz, 1 $\phi$ is mounted by motor support posts 80 of appropriate size and number. A motor coupling generally indicated at 82 is operatively associated with the rotary shutter shaft. For the sequential phasing operational movement of the shutter for activating the various test cells a 110 v. AC solenoid 84 is attached by means of solenoid bracket 86 to the cell housings. A five toothed ratchet wheel 88 is adapted for axial movement by solenoid 84 upon releasing index pawl 90 and relieving spring pressure of solenoid return spring 92 on shutter O-ring 76. This solenoid return spring not only applies pressure on the shutter O-ring but also resets the index pawl 90. The solenoid function is accomplished through a solenoid lever 94 pivotably mounted on lever bracket 96 and which lever is bifurcated at its free end 98 for engagement through pins 100 with ratchet wheel 88. A pawl block 102 mounts a pawl latch 104 with operatively attached pawl spring 106. Details of the foregoing mechanism are clearly shown in FIGS. 3 and 5 of the drawings.

Figure 2:
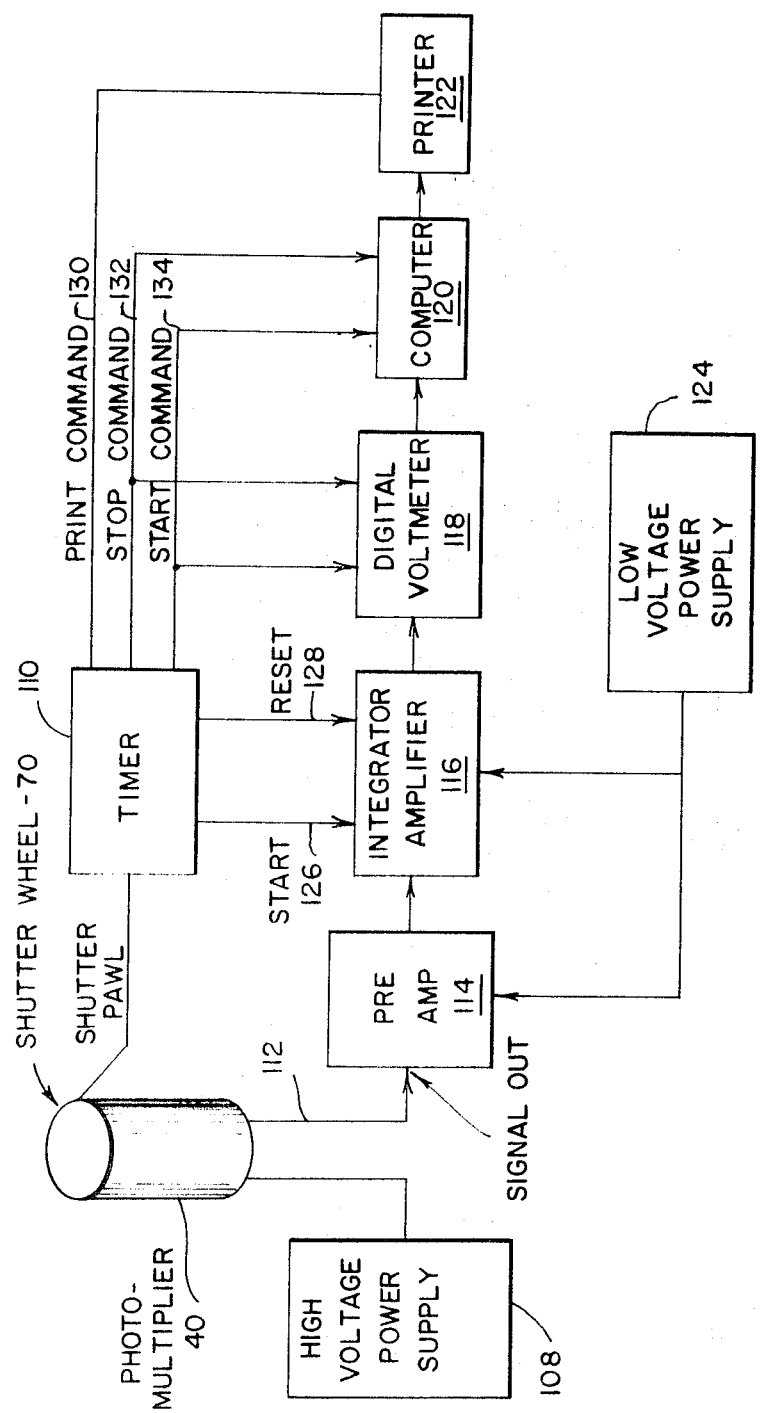
FIG. 2 is a schematic of a control and operating circuit for the invention.
Figure 3:
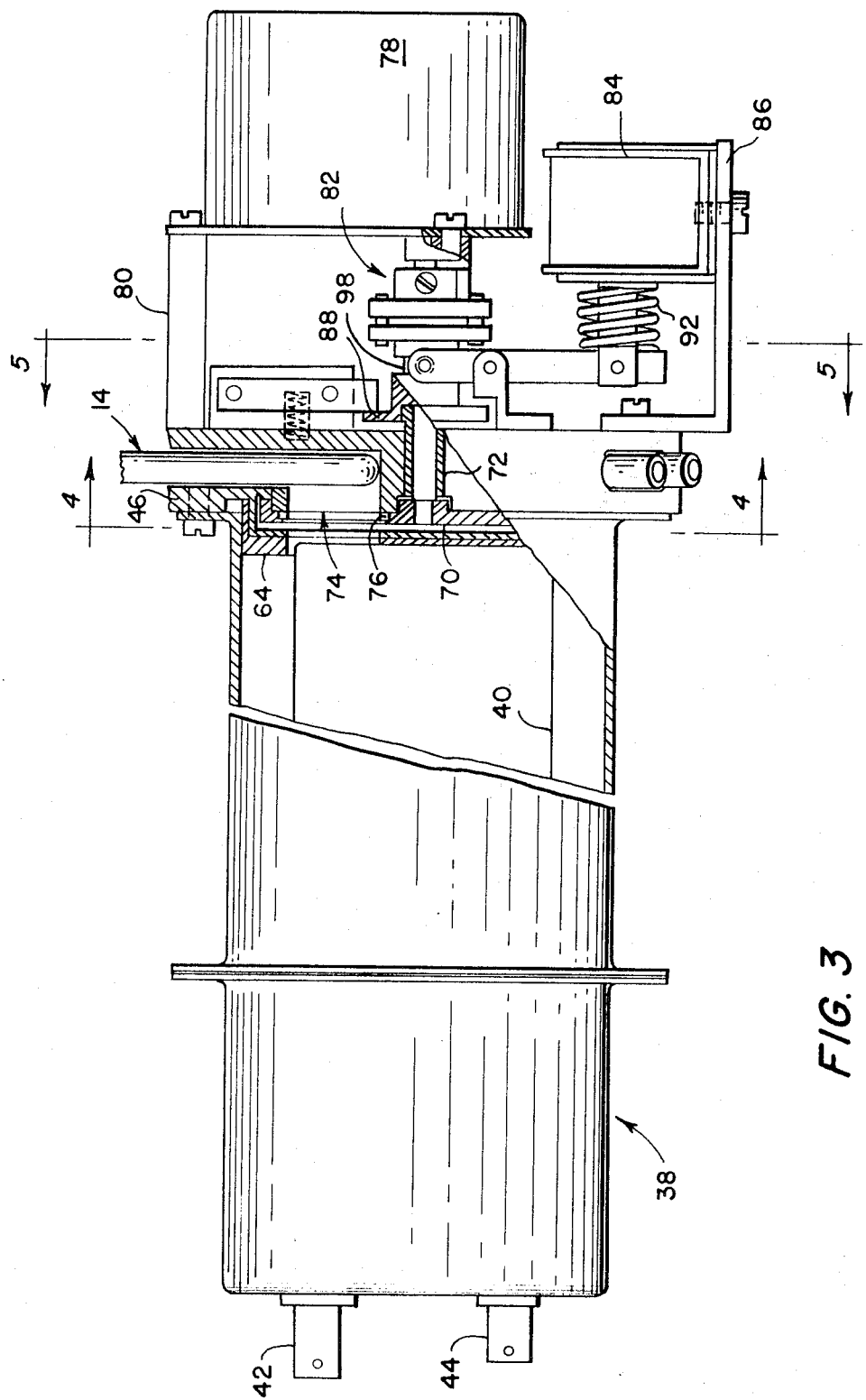
FIG. 3 is a view of a cell assembly for use in practicing the invention as set up for five test channels, a portion being broken away for clarity of detail.

The foregoing described mechanism is designed for the chemiluminescence method of monitoring air pollutants utilizing five microreactors (channels) simultaneously by means of sequential monitoring by a single photo-multiplier. The channel monitoring is controlled by the rotary shutter which moves discretely from channel to channel and a quantitative analysis of the gaseous components of the atmosphere is obtained by comparison of the signals obtained from the separate channels with calibrated standards for each channel. The signal processing may utilize a simple computer circuitry. An operating circuit is schematically depicted in FIG. 2 of the drawings. The various stations (five in number) are indicated on FIG. 5 of the drawings and include:

Station 1 — Filtered air (background reference)
Station 2 — Ozone ($O_3$)
Station 3 — Nitrogen dioxide ($NO_2$)
Station 4 — Nitric oxide and nitrogen dioxide ($NO_2 + NO$)
Station 5 — Sulfur dioxide ($SO_2$).

The foregoing are indicated in gaseous outputs.

Referring to FIG. 2 of the drawings operation of the photo-multiplier tube 40 and shutter wheel or shutter 70 are activated from a high voltage power supply 108 and a shutter pawl timer 110 respectively. Signals from the photo-multiplier pass through signal out lead 112 to a pre-amplifier 114 and thence to integrator amplifier 116, digital voltmeter 118, computer 120 to printer 122 for test result indication. A low voltage power supply 124 feeds pre-amplifier 114 and integrator amplifier 116. Timer 110 is operatively interconnected with integrator amplifier 116 through start lead 126 and reset lead 128. Timer 110 is also operatively connected with the digital voltmeter, computer and printer respectively through print command lead 130 stop command lead 132 and start command lead 134 as schematically illustrated in FIG. 2.

The following table shows the sequence of timed events for the five channel system shown and described herein. In essence, each cell will be read once every minute and the integrated signal from each will be used to calculate an analysis of each of the four gaseous constituents on the schedule, reference being made to the gaseous station details of FIG. 5.

0 Seconds — Shutter Window at Station No. 1 (Bkgrd)
+ 1 Seconds — Start Integrator
+ 11 Seconds — Transfer Signal to Digital Voltmeter and/or Recorder or Computer
+ 12 Seconds — Signal Off and Reset Integrator
+ 12 Seconds — Rotate Window to Station No. 2
+ 13 Seconds — Start Integrator
+ 23 Seconds — Transfer Signal to Digital Voltmeter, etc.
+ 24 Seconds — Rotate Window to Station No. 3
+ 25 Seconds — Start Integrator
+ 35 Seconds — Transfer Signal to Digital Voltmeter, etc.
+ 36 Seconds — Rotate Window to Station No. 4
+ 37 Seconds — Start Integrator
+ 47 Seconds — Transfer Signal to Digital Voltmeter, etc.
+ 48 Seconds — Rotate Window to Station No. 5
+ 49 Seconds — Start Integrator
+ 59 Seconds — Transfer Signal to Digital Voltmeter, etc.
+ 60 Seconds — Rotate Window to Station No. 1

REPEAT OPERATION

For a six channel system for example repetitions will occur every 10 seconds.

Subsequent to the foregoing time sequence repeat operation is initiated.

Operation of the invention will be more readily understood from results of sensitivity tests run to determine sensitivity of the chemiluminescence reaction to the four gases: $SO_2$, $O_3$, $NO_2$, and NO.

All operations were conducted dynamically. In this operation, $SO_2$, $NO_2$, and NO were diluted in two steps: (1) gases from tank supplies were passed into a surge or test chamber of 6-inch pipe where they were mixed with purified air. (2) Various quantities (50 to 1,000 ml./min.) of this supply were further diluted with filtered air in a second dilution step. Utilization of this two-step procedure made available dilutions upward from 19 p.p.b. by volume. Gas samples from the dilutor were fed directly into the chemiluminescence reactor cell where mixing with luminol and hydrogen peroxide solutions took place. Air was passed through the sample reaction tube at flow rates from 500 ml./min. to 6.7 liters/min. The liquid reagents, usually 0/25 mg./ml. of luminol in 0.05 N NaOH and 0.6 percent $H_2O_2$, were fed to the cells. The cell was placed directly next to the 2-inch (diameter) face of an EMI (9558) photo-multiplier tube which monitored the light output from the reaction. Liquid reagents were fed into the cell at rates from 0.1 to 0.5 ml./minute each. The optical cell tubing diameter was 0.187 in., I.D. The liquid-gas mixture was pulled by a Neptune-Dyna pump into a separation chamber, which in these tests was a separatory flask. The gases were then exhausted from the pump into the room atmosphere.

For tests with pure gas components, air was passed through charcoal filters before use. The main supply passed through an MSA CBR 86475 filter assembly before diluting the pollutant test sample. A CMA Canister Air Purifier, Serial C (Barneby-Cheney Corporation), was used on the air source to the sample gas supply.

Tests of atmospheric air were conducted by pulling air directly from the room into the reactor cells.

Teflon tubing was used throughout.

Figure 8:
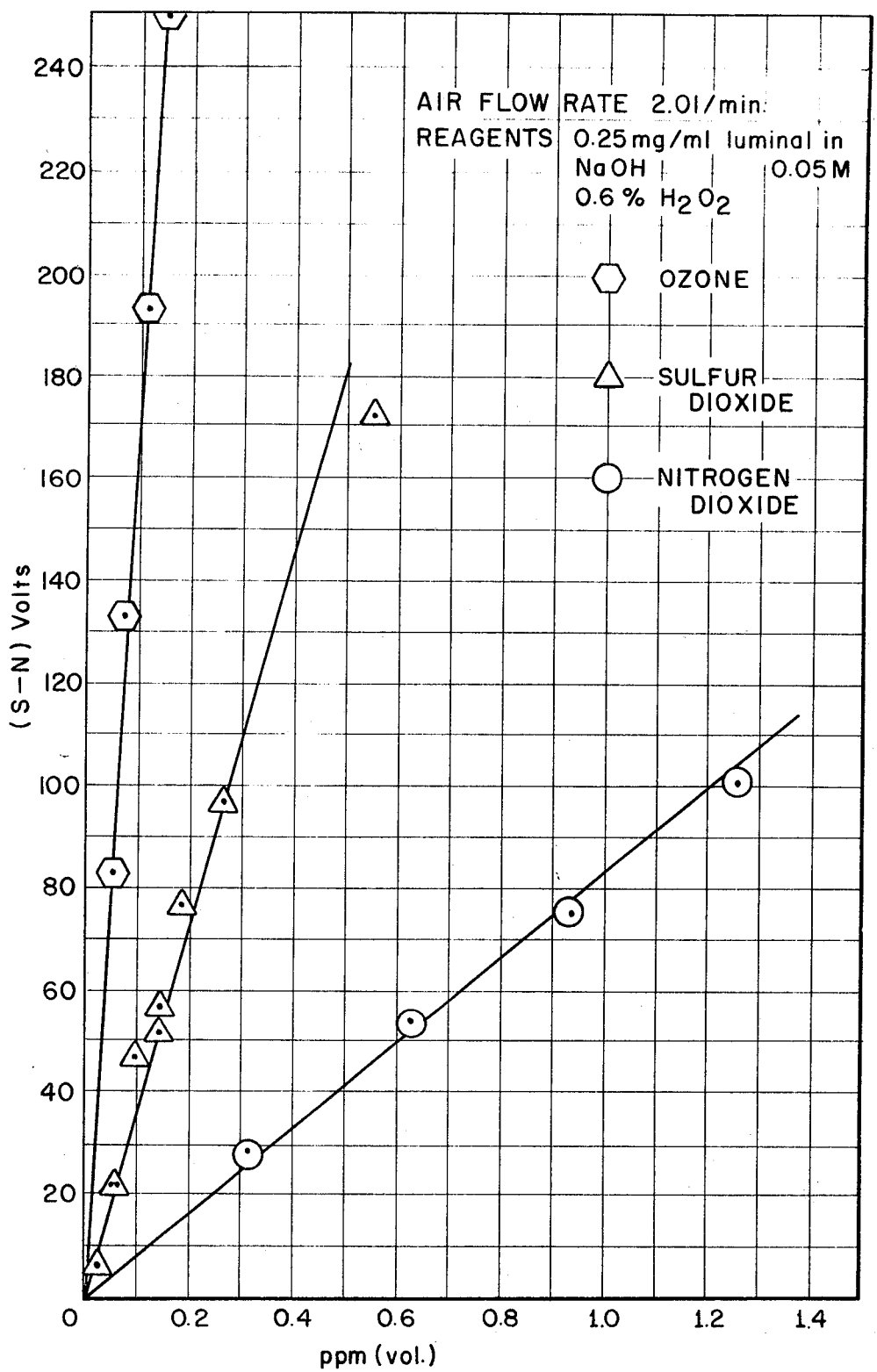
FIG. 8 is a chart of detection sensitivity in accordance with utilization of the present invention.

A set of results is indicated in FIG. 8, which is a plot of (S–N) in volts vs. gas concentration in ppm (volume). In this terminology, S is the total signal in volts obtained from the photomultiplier under test conditions, and N is the background obtained with filtered air. Thus (S–N) is the signal arising from the gas sample flowing through the reactor cell. The background values, N, are normally in the range of 2–5 volts. In the cases of $SO_2$, $NO_2$, and NO, these tests were conducted by passing the gases at a rate of 1.0 ml./min. into a wax-lined mixing chamber (602 l, volume) which was exhausted at a rate of 122.5 liters/min. The diluted gas from the chamber was mixed with fresh, filtered air at a total flow rate of 2.0 liters/min. sample rates from the mixing chamber varied from 50 ml./min. to 1,000 ml./min. For ozone, the procedure was modified: filtered air was passed at various flow rates through a stainless container (1.2 l in volume) which contained a GE germicidal lamp (G.E. No. G4S–11) and then mixed with the dilutor air stream to achieve a total flow rate of 2.0 liters of air per minute. The "ozonizer" output was calibrated using the buffered potassium iodide method. For these tests, the liquid reagents were (1) luminol (0.25 mg./ml.) in 0.05 M NaOH and (2) 0.6 percent $H_2O_2$. The reagents were mixed at the cell entry. FIG. 8 shows that sulfur dioxide, nitrogen dioxide, and ozone are sensitively detectable by this method. Nitric oxide must be converted to $NO_2$ to be measurable. The following table compares the results.

DETECTION OF $SO_2$, $NO_2$ AND $O_3$

| Gas | Responses/10 p.p.b. |
|---|---|
| $O_3$ | 17.9 volts |
| $SO_2$ | 3.64 |
| $NO_2$ | 0.72 |

No visible light was emitted during exposure to nitric oxide (NO). Nitric oxide analyses are obtained by converting NO to $NO_2$ over the acidic chromium trioxide column, described below. These results indicate that $SO_2$, $O_3$, and $NO_2$ are easily monitorable as is NO after conversion. Since under normal conditions, a signal change of 0.5 volts is readily detectable, detection thresholds of the order of the following are estimated for the pure gases under these conditions.

DETECTION THRESHOLDS

| | |
|---|---|
| $SO_2$ | 0.3 p.p.b. (vol.) |
| $O_3$ | 1.4 |
| $NO_2$ (and NO) | 6.9 |

Detection thresholds and system sensitivity may be increased or adjusted by modification of the operating parameters in the cell: reagent concentrations, air flow rate (linear velocity), and to a much lesser extent, liquid feed rate.

Separation of Signals from Gaseous Components

In order to separate the signals from a mixture of gases, a series of adsorbents were examined for utility in treatment of the air stream before entry into the reactor. These columns were tested initially with pure (diluted) components. Final column selections were tested in separation of the signals from a relatively clean Pomona, California atmosphere.

Chromium trioxide, ferrous sulfate, and ascarite columns were utilized to separate signals from the four components: $SO_2$, $NO_2$, $O_3$, and NO. The following table shows the functions of these columns.

| Column | Gaseous Component Passed | Gaseous Component Removed |
|---|---|---|
| Ferrous Sulfate | $SO_2$, NO | $O_3$, $NO_2$ ($NO_2 \rightarrow$ NO) |
| Chromium Trioxide | $O_3$, $NO_2$ (NO $\rightarrow NO_2$) | $SO_2$ |
| Ascarite | NO | $O_3$, $SO_2$, $NO_2$ |

The ferrous sulfate column was prepared by dissolving 5.0 g. of c.p. ferrous sulfate in 30 ml. of glass distilled water and impregnating six 12.5 cm. Whatman GF/A glass fiber filters (123 $cm.^2$, each). After drying at 80° C., the sheets were cut into ⅓ in. squares and packed into 8 in. drying tubes. After conditioning for four hours by air passage at 2 liters/min, the column was used without further modification.

The chromium trioxide column was prepared according to the procedure of M. Katz (*Air Pollution, ed. by A.C. Stern, Academic Press, New York, 1968, p. 90; B.E. Saltzman and A.F. Wartburg, Anal. Chem., 37, 779 (1965)). It was used in an 8-inch drying tube.

The following table compares some of the results obtained with the three columns separately. The air sampling rate utilized was 2.0 liters/min. These results form the basis for separation of signals from the components passed by the columns.

COLUMN PERFORMANCES*

[Air sampling rate: 2 liters/minute]

| Gas | Sulfur dioxide | Ozone | Nitrogen dioxide | Nitrogen oxide |
|---|---|---|---|---|
| Column: | | | | |
| Chromium trioxide: | | | | |
| Concentration (p.p.m.) | 0.14 | 0.23 | 1.0 | 1.0 |
| Signal, column out (v.) | 88 | **250 | 55 | 0 |
| Signal, column in (v.) | 0.0 | **250 | 46–52 | 32–46 |
| Ferrous sulfate: | | | | |
| Concentration (p.p.m.) | 0.14 | 0.23 | 1.0 | 1.0 |
| Signal, column out (v.) | 85 | **250 | 54 | 0 |
| Signal, column in (v.) | 82 | 0.1–1.5 | 5–7 | 0 |
| Ascarite: | | | | |
| Concentration (p.p.m.) | 0.14 | 0.23 | 1.0 | 1.0 |
| Signal, column out (v.) | 90 | **250 | 56 | 0 |
| Signal, column in (v.) | 0.2 | 0.0 | 2 | 0 |

*$H_2O_2$ at 0.6 percent Luminol at 0.25 mg./ml. in 0.05 N NaOH.
**Photomultiplier saturation.

Signal Processing

Five or six chemiluminescence signal inputs may be used to obtain the analysis for $SO_2$, $NO_2$, $O_3$, and NO. The following table indicates the basis for the approach which was utilized in practical air tests:

BASIS FOR GASEOUS ANALYSES

| Signal | Adsorbent | Measured gases |
|---|---|---|
| $V_1$ | Ascarite*-ferrous sulfate-chromic oxide. | NO (as $NO_2$). |
| $V_2$ | Ferrous sulfate-chromic oxide | $NO+NO_2$ (as $NO_2$) (as $NO_2$). |
| $V_3$ | Chromic oxide | $O_3+NO_2+NO$ (as $NO_2$). |
| $V_4$ | Ferrous sulfate | $SO_2$. |
| $V_5$ | Charcoal | Chemical background corrected by reagents. |
| $V_6$ | None | $SO_2$, $O_3$, $NO_2$. |

*Since $CO_2$ does not interfere in the reaction, a number of basic adsorbents which are more stable may be used. Sodium carbonate on glass fiber paper has been effective and appears to have a much longer life.

The determination of $V_6$ is optional and may be used to double check the results.

Thus, by applying simple algebra, the signals from the individual components may be isolated as follows:

$$V_4 - V_5 = V_{SO_2}$$
$$V_1 - V_5 = V_{NO}$$
$$V_2 - V_1 = V_{NO_2}$$
$$V_2 - V_2 = V_{O_3}$$

An optional check on the independent results may be obtained from $V_6$:

$$V_6 - V_5 = V_{NO_2} + V_{O_3} + V_{SO_2}.$$

In order to obtain solutions for the individual gas concentrations from the photomultiplier output voltages, a calibration for each of the components in the presence of the appropriate adsorbent column or series of columns is required. These calibrations yield gas concentration in the air vs. photo-multiplier signal (S–N) in volts.

Analyses of Ambient Air

In order to test the concepts involved in analysis of ambient air, a series of tests have been conducted in the Geomet laboratory in Pomona, California. The air was sampled from within a large loft-type assembly area which had open loading doors leading to the outside and two roof ports. The reagent system utilized comprised: (1) luminol at 0.25 mg./ml. in 0.05 N Na OH. (This solution also contained 1.0 mg./ml. EDTA.) (2) Hydrogen peroxide at 1 percent. (Air was sampled at a rate of 2 liters/minute.) Analyses were determined on the basis of previously established calibrations.

During mornings, it was observed that total pollutants were very low, with ozone levels usually well below 0.1 p.p.m. Small amounts of NO (0.05–0.10 p.p.m.), $NO_2$ (< 0.05 ppm) and $SO_2$ (~0.01 - 0.02 ppm) were observable. Commencing at about 11:00 a.m., ozone levels were observed to rise; $NO_2$ levels usually increased and $SO_2$ remained about the same. A typical result obtained midafternoon (3:00 p.m.) was:

| | |
|---|---|
| Ozone | 0.26 p.p.m. |
| NO | 0.05 p.p.m. |
| $NO_2$ | 0.26 p.p.m. |
| $SO_2$ | 0.03 p.p.m. |

Summary of Apparent Technical Results
a. Luminol chemiluminescence can be applied to monitor $SO_2$, $NO_2$, NO and $O_3$, utilizing very simply instrumentation. Other gases such as chlorine and peroxyacetyl nitrate may also be detected.
b. The chemiluminescence responses are linear functions of concentration for each of the gases over very wide concentration ranges.
c. The signal output for the chemiluminescence reaction varies with gaseous components, reagent concentrations, flow conditions, and reactor configurations. Response sensitivity may be adjusted within wide ranges by appropriate selection of these physical parameters.
d. Under controlled conditions, without optimizing operating parameters, 10 p.p.b. (volume), predictably will show the following signals:

| | |
|---|---|
| Sulfur Dioxide | 10.4 volts |
| Ozone | 2.8 volts |
| Nitrogen Dioxide | 1.8 volts |
| (and Nitric Oxide after conversion | to $NO_2$) |

Minor changes can be effected in the method, system and apparatus without departing from the spirit and scope of the invention as defined in the appended claims.

We claim:
1. A system for monitoring air pollution in gaseous form utilizing chemiluminescence reactions, comprising:
   A. a chemiluminescence reactor cell;
   B. means to sample ambient air for suspected pollutant gases contained therein and introduce the ambient air into said cell;
   C. means to selectively react in said reactor cell the pollutant gases contained in sampled ambient air with aqueous solutions of luminol and hydrogen peroxide which produce light during reaction with the pollutants in a two phase reaction including:
      i. an aqueous phase containing luminol which is oxidized to produce photons; and
      ii. a gas phase which reacts in the cell with luminol at the interface between the gas and liquid surface; and
   D. means to detect and quantitatively analyze the gaseous pollutant contents developed in the reactions by produced light measurements.
2. 2. A system as claimed in claim 1, wherein the pollutant gases are reacted by direct reaction between the pollutant components and an aqueous mixture of luminol (5-amino-2-, 3-dihydro-1, 4-phthalazinedione) and hydrogen peroxide.
3. A system as claimed in claim 2, and means to mix the aqueous chemical reagents immediately prior to reaction with the gaseous air pollutants.
4. A system as claimed in claim 3, and means to produce required intimate contact between the pollutant gases and the light-producing chemical reagents in an optical cell.
5. A system as claimed in claim 4, and means to separate the components of the pollution gas mixture prior to entry into a plurality of reaction cells.
6. A system as claimed in claim 5, and means to monitor multiple gas streams by a single photomultiplier sensor.
7. A system as claimed in claim 6, and means to simultaneously monitor a mixture of air pollutants with a real-time readout or analysis.
8. A system as claimed in claim 7, and means to eliminate chemical interferences in the analysis of the separate pollution components.
9. A system as claimed in claim 8, and means to selectively view a series of chemical reactor cells on a preselected time sequence.
10. A system as claimed in claim 9, and means to automatically control viewing time at each optical cell.
11. A system as claimed in claim 10, and means to extend the sensitivity range of a photomultiplier sensor by introduction of selected optical filtering materials between a light source and a light sensor.
12. A system as claimed in claim 11, and means to introduce a series of optical filters between the reaction cells and the photomultiplier sensor.
13. A method for monitoring gaseous pollutants in the air, including sulfur dioxide, nitrogen dioxide, ozone, nitric oxide, chlorine, and other oxidants, comprising:
   A. sampling ambient air for suspected pollutant gases contained therein;
   B. selectively reacting in a chemiluminescence reactor cell various of said pollutant gases in said ambient air with aqueous solutions of luminol and hydrogen peroxide which produce light during reaction with the pollutants in a two phase reaction including:
      i. an aqueous phase containing luminol which is oxidized to produce photons; and
      ii. a gas phase which reacts in the cell with luminol at the interface between the gas and liquid surface; and
   C. detecting and quantitatively analyzing the pollutant contents developed in the reactions by produced light measurements.
14. A method as claimed in claim 1, wherein the pollutant gases are reacted by direct reaction between the pollutant components and an aqueous mixture of luminol (5-amino-2-, 3-dihydro-1, 4-phthalazinedione) and hydrogen peroxide.
15. A method as claimed in claim 14, including intimately contacting the pollutant gases and the light producing chemical reagents in an optical cell.
16. A method as claimed in claim 15, including separating the components of the pollution gas mixture prior to entry into a reaction cell.
17. A method as claimed in claim 16, including monitoring multiple gas streams in a single photomultiplier sensor.
18. A method as claimed in claim 17, including simultaneously monitoring a mixture of air pollutants with a real-time readout or analysis.
19. A method as claimed in claim 18, including eliminating chemical interferences in the analysis of the separate pollution components.
20. A method as claimed in claim 19, including selectively viewing a series of reactions in chemical reactor cells on a preselected time sequence.
21. A method as claimed in claim 20, including automatically controlling viewing time at each optical cell.
22. A method as claimed in claim 21, including extending the sensitivity range of a photomultiplier sensor by introducing selected optical filtering materials between a light source and a light sensor.
23. A method as claimed in claim 22, including introducing a series of optical filters between the reaction cells and the photomultiplier sensor.

* * * * *